United States Patent
Huynh et al.

(10) Patent No.: US 12,159,450 B2
(45) Date of Patent: Dec. 3, 2024

(54) MODEL TRAINING METHOD AND SYSTEM

(71) Applicant: VINBRAIN JOINT STOCK COMPANY, Ha Noi (VN)

(72) Inventors: Minh Thanh Huynh, Ha Noi (VN); Chanh D T Nguyen, Ha Noi (VN); Steven Quoc Hung Truong, Ha Noi (VN)

(73) Assignee: VINBRAIN JOINT STOCK COMPANY, Ha Noi (VN)

( * ) Notice: Subject to any disclaimer, the term of this patent is extended or adjusted under 35 U.S.C. 154(b) by 332 days.

(21) Appl. No.: 17/899,709

(22) Filed: Aug. 31, 2022

(65) Prior Publication Data

US 2023/0081118 A1 Mar. 16, 2023

(30) Foreign Application Priority Data

Sep. 13, 2021 (VN) ............................... 1-2021-05660

(51) Int. Cl.
| | |
|---|---|
| G06V 10/774 | (2022.01) |
| G06N 3/08 | (2023.01) |
| G06V 10/74 | (2022.01) |
| G06V 10/771 | (2022.01) |
| G06T 3/4053 | (2024.01) |

(52) U.S. Cl.
CPC ........... *G06V 10/7753* (2022.01); *G06N 3/08* (2013.01); *G06V 10/761* (2022.01); *G06V 10/771* (2022.01); *G06T 3/4053* (2013.01); *G06T 2207/10116* (2013.01)

(58) Field of Classification Search
None
See application file for complete search history.

(56) References Cited

U.S. PATENT DOCUMENTS

| | | | |
|---|---|---|---|
| 11,734,918 B2 * | 8/2023 | Chiba | ................ H04N 7/18 382/103 |
| 2021/0279595 A1 * | 9/2021 | Sridhar | .................. G06N 3/084 |
| 2022/0156595 A1 * | 5/2022 | Kadayam Viswanathan | ............... G06N 3/084 |

* cited by examiner

*Primary Examiner* — Haris Sabah
(74) *Attorney, Agent, or Firm* — Carter, DeLuca & Farrell LLP (57) ABSTRACT

The invention provides a model training method and system that uses pretrained features of a teacher neural network trained on a billion-size dataset to train a student neural network. The model training method leverages the teacher neural network to design a more stable loss function that works well with more sophisticated learning rate schedules to reduce training time and make the augmentation designing process more natural.

8 Claims, 2 Drawing Sheets

MODEL TRAINING METHOD AND SYSTEM

FIELD OF THE INVENTION

Embodiments of the invention relate to a model training method and system for training a student neural network using a trained teacher neural network.

DISCUSSION OF RELATED ART

Convolutional Neural Network (CNN) has achieved astounding performances in many areas of many medical imaging tasks. However, CNN requires a massive amount of training data to achieve a good performance. Therefore, many approaches in medical imaging tasks like classification or segmentation use networks pretrained on a natural image dataset like ImageNet to reduce the amount of needed data and accelerate the convergence. However, the natural images-based pretrained models are overparametrized for many medical imaging tasks.

Recently, contrastive unsupervised learning approaches [1, 2, 3] remove the barrier of having annotation in pretraining. In SimCLR [1], the authors proposed using a large batch size and long training time to acquire a good pretrained model. MoCo v1 and v2 [2, 3] further reduce memory consumption and training time of SimCLR by using a momentum encoder. However, they require a week-long training time for state-of-the-art architectures. Furthermore, their training process uses unnatural strong data augmentations. The long training time comes from the need to embed the whole training dataset on a hypersphere. The unnatural strong data augmentations are needed to prevent the model from cheating and to learn meaningful features [1].

Therefore, there is a need for an approach to reduce training time and make the augmentation designing process more natural.

CITATION LIST

Non-Patent Literature

1. Ting Chen, Simon Kornblith, Mohammad Norouzi, and Geoffrey E. Hinton. A simple framework for contrastive learning of visual representations. In *Proceedings of the 37th International Conference on Machine Learning, ICML 2020, 13-18 Jul. 2020, Virtual Event*, volume 119 of *Proceedings of Machine Learning Research*, pages 1597-1607. PMLR, 2020. The citation is herein referred to as [1].
2. Xinlei Chen, Haoqi Fan, Ross B. Girshick, and Kaiming He. Improved baselines with momentum contrastive learning. *CoRR*, abs/2003.04297, 2020. The citation is herein referred to as [2].
3. Kaiming He, Haoqi Fan, Yuxin Wu, Saining Xie, and Ross B. Girshick. Momentum contrast for unsupervised visual representation learning. In *2020 IEEE/CVF Conference on Computer Vision and Pattern Recognition, CVPR 2020, Seattle, WA, USA, Jun. 13-19, 2020*, pages 9726-9735. IEEE, 2020. doi: 10.1109/CVPR42600.2020.00975. The citation is herein referred to as [3].
4. Jeremy Irvin, Pranav Rajpurkar, Michael Ko, Yifan Yu, Silviana Ciurea-Ilcus, Chris Chute, Henrik Marklund, Behzad Haghgoo, Robyn L. Ball, Katie S. Shpanskaya, Jayne Seekins, David A. Mong, Safwan S. Halabi, Jesse K. Sandberg, Ricky Jones, David B. Larson, Curtis P. Langlotz, Bhavik N. Patel, Matthew P. Lungren, and Andrew Y. Ng. Chexpert: A large chest radiograph dataset with uncertainty labels and expert comparison. In *The Thirty-Third AAAI Conference on Artificial Intelligence, AAAI 2019, The Thirty-First Innovative Applications of Artificial Intelligence Conference, IAAI 2019, The Ninth AAAI Symposium on Educational Advances in Artificial Intelligence, EAAI 2019, Honolulu, Hawaii, USA, Jan. 27-Feb. 1, 2019*, pages 590-597. AAAI Press, 2019. doi: 10.1609/aaai.v33i01.3301590. The citation is herein referred to as [4].
5. Alistair E. W. Johnson, Tom J. Pollard, Seth J. Berkowitz, Nathaniel R. Greenbaum, Matthew P. Lungren, Chih-ying Deng, Roger G. Mark, and Steven Horng. MIMIC-CXR: A large publicly available database of labeled chest radiographs. *CoRR*, abs/1901.07042, 2019. The citation is herein referred to as [5].
6. Aurelia Bustos, Antonio Pertusa, José Maria Salinas, and Maria de la Iglesia-Vayá. Padchest: A large chest x-ray image dataset with multi-label annotated reports. *Medical Image Anal.*, 66:101797, 2020. doi: 10.1016/j.media.2020.101797. The citation is herein referred to as [6].
7. Xiaosong Wang, Yifan Peng, Le Lu, Zhiyong Lu, Mohammadhadi Bagheri, and Ronald M. Summers. Chestx-ray8: Hospital scale chest x-ray database and benchmarks on weakly-supervised classification and localization of common thorax diseases. In *2017 IEEE Conference on Computer Vision and Pattern Recognition, CVPR 2017, Honolulu, HI, USA, Jul. 21-26, 2017*, pages 3462-3471. IEEE Computer Society, 2017. doi: 10.1109/CVPR.2017.369. The citation is herein referred to as [7].
8. Dhruv Mahajan, Ross B. Girshick, Vignesh Ramanathan, Kaiming He, Manohar Paluri, Yixuan Li, Ashwin Bharambe, and Laurens van der Maaten. Exploring the limits of weakly supervised pretraining. In Vittorio Ferrari, Martial Hebert, Cristian Sminchisescu, and Yair Weiss, editors, *Computer Vision—ECCV 2018-15$^{th}$ European Conference, Munich, Germany, Sep. 8-14, 2018, Proceedings, Part II*, volume 11206 of *Lecture Notes in Computer Science*, pages 185-201. Springer, 2018. doi: 10.1007/978-3-030-01216-8\_12. The citation is herein referred to as [8].
9. Ilija Radosavovic, Raj Prateek Kosaraju, Ross B. Girshick, Kaiming He, and Piotr Dollár. Designing network design spaces. In *2020 IEEE/CVF Conference on Computer Vision and Pattern Recognition, CVPR 2020, Seattle, WA, USA, Jun. 13-19, 2020*, pages 10425-10433. IEEE, 2020. doi: 10.1109/CVPR42600.2020.01044. The citation is herein referred to as [9].
10. Jie Hu, Li Shen, Samuel Albanie, Gang Sun, and Enhua Wu. Squeeze-and-excitation networks. *IEEE Trans. Pattern Anal. Mach. Intell.*, 42(8):2011-2023, 2020. doi: 10.1109/TPAMI.2019.2913372. The citation is herein referred to as [10].
11. Byeongho Heo, Jeesoo Kim, Sangdoo Yun, Hyojin Park, Nojun Kwak, and Jin Young Choi. A comprehensive overhaul of feature distillation. In *2019 IEEE/CVF International Conference on Computer Vision, ICCV 2019, Seoul, Korea (South), Oct. 27-Nov. 2, 2019*, pages 1921-1930. IEEE, 2019. doi: 10.1109/ICCV.2019.00201. The citation is herein referred to as [11].
12. Leslie N. Smith and Nicholay Topin. Super-convergence: Very fast training of residual networks using large learning rates. *CoRR*, abs/1708.07120, 2017. The citation is herein referred to as [12].
13. Gao Huang, Zhuang Liu, Laurens van der Maaten, and Kilian Q. Weinberger. Densely connected convolutional networks. In *2017 IEEE Conference on Computer Vision* and *Pattern Recognition, CVPR* 2017, Honolulu, HI, USA, Jul. 21-26, 2017, pages 2261-2269. IEEE Computer Society, 2017. doi: 10.1109/CVPR.2017.243. The citation is herein referred to as [13].
14. Saining Xie, Ross B. Girshick, Piotr Dollar, Zhuowen Tu, and Kaiming He. Aggregated residual transformations for deep neural networks. In 2017 *IEEE Conference on Computer Vision and Pattern Recognition, CVPR* 2017, Honolulu, HI, USA, Jul. 21-26, 2017, pages 5987-5995. IEEE Computer Society, 2017. doi: 10.1109/CVPR.2017.634. The citation is herein referred to as [14].
15. Mingxing Tan and Quoc V. Le. Efficientnet: Rethinking model scaling for convolutional neural networks. In Kamalika Chaudhuri and Ruslan Salakhutdinov, editors, *Proceedings of the 36th International Conference on Machine Learning, ICML* 2019, 9-15 Jun. 2019, Long Beach, California, USA, volume 97 of *Proceedings of Machine Learning Research*, pages 6105 6114. PMLR, 2019. The citation is herein referred to as [15].
16. Sergey Zagoruyko and Nikos Komodakis. Paying more attention to attention: Improving the performance of convolutional neural networks via attention transfer. In $5^{th}$ *International Conference on Learning Representations, ICLR* 2017, Toulon, France, Apr. 24-26, 2017, *Conference Track Proceedings*. OpenReview.net, 2017. The citation is herein referred to as [16].

SUMMARY OF THE INVENTION

The invention is directed to providing a model training method and system for training a student neural network using a teacher neural network. The model training method and system leverages the teacher neural network trained on a billion-size dataset to design a more stable loss function that works well with more sophisticated learning rate schedules to reduce training time. Furthermore, the model training method and system according to the invention alleviates the need to acquire a billion-size dataset and reduces training time and makes the augmentation designing process more natural.

According to a first aspect of the invention, there is provided a model training method, the method comprising:
  providing a teacher neural network that has been trained using a first training image dataset to determine trained values of a plurality of teacher model parameters of the teacher neural network;
  providing a student neural network having a plurality of student model parameters;
  providing a second training image dataset;
  processing each training input image of the second training image dataset using the teacher neural network in accordance with the trained values of the plurality of teacher model parameters to generate a plurality of teacher intermediate feature maps and a teacher global feature map, wherein the teacher neural network comprises a plurality of teacher resolution blocks, wherein the plurality of teacher intermediate feature maps are respective outputs of the plurality of teacher resolution blocks, and wherein the teacher global feature map is an output in the end of the teacher neural network;
  processing the each training input image of the second training image dataset using the student neural network to generate a plurality of student intermediate feature maps and a student global feature map, wherein the student neural network comprises a plurality of student resolution blocks, wherein the plurality of student intermediate feature maps are respective outputs of the plurality of student resolution blocks, and wherein the student global feature map is an output in the end of the student neural network;
  determining a feature transfer loss that measures a distance between the plurality of teacher intermediate feature maps and the plurality of student intermediate feature maps;
  determining a diffeomorphism matching loss that measures a distance between the teacher global feature map and the student global feature map; and
  adjusting values of the plurality of student model parameters using the feature transfer loss and the diffeomorphism matching loss to determine trained values of the plurality of student model parameters.

According to a second aspect of the invention, there is provided a model training system comprising one or more computers and one or more storage devices storing instructions that, when executed by the one or more computers, cause the one or more computers to perform the model training method according to the first aspect of the invention.

BRIEF DESCRIPTION OF THE DRAWINGS

The above and other objects, features and advantages of the invention will become more apparent to those of ordinary skill in the art by describing in detail exemplary embodiments thereof with reference to the attached drawings, in which.

DETAILED DESCRIPTION OF EXEMPLARY EMBODIMENTS

While the invention may have various modifications and alternative forms, specific embodiments thereof are shown by way of example in the drawings and will be described herein in detail. However, there is no intent to limit the invention to the particular forms disclosed. On the contrary, the invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the invention. As used herein, the term "and/or" includes any and all combinations of one or more of the associated listed items.

The terminology used herein is for the purpose of describing particular embodiments only and is not intended to be limiting to the invention. As used herein, the singular forms "a," "an," "another," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

And throughout the detailed description and claims of the present disclosure, the term "training" or "learning" refers to performing machine learning through computing according to a procedure. It will be appreciated by those skilled in the art that it is not intended to refer to a mental function such as human educational activity.

As used herein, a model is trained to output a predetermined output with respect to a predetermined input, and may include, for example, neural networks. A neural network refers to a recognition model that simulates a computation capability of a biological system using a large number of artificial neurons being connected to each other through edges.

The neural network uses artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

Hereinafter, training a neural network refers to training parameters of the neural network. Further, a trained neural network refers to a neural network to which the trained parameters are applied.

The neural network may be trained through supervised learning or supervised learning. Supervised learning refers to a method of providing input data and label corresponding thereto to the neural network, while in unsupervised learning, the input data provided to the neural network does not contain label.

As used herein, fine-tuning is a process of adjusting the parameters of a pretrained neural network for specific tasks.

Figure 1:
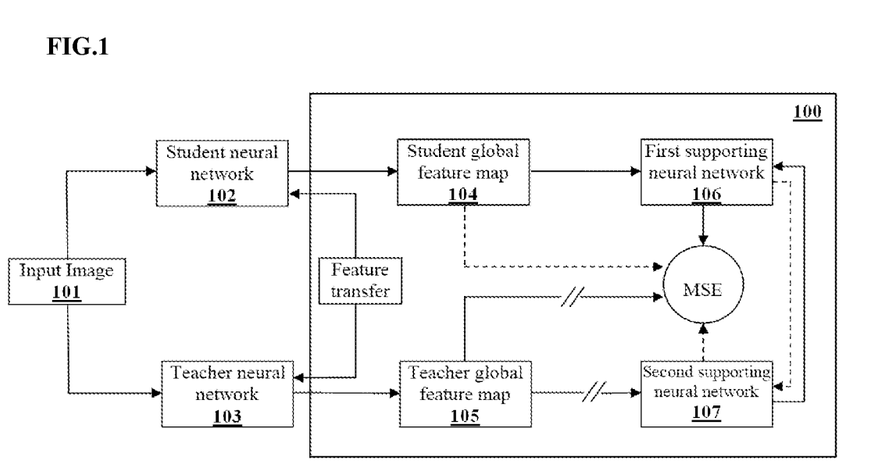
FIG. 1 shows an example model training system.

FIG. 1 is a block diagram of an example model training system 100 for training a student neural network 102 according to an embodiment of the invention. The model training system 100 is an example of a system implemented as computer programs on one or more computers in one or more locations in which the systems, components, and techniques described below are implemented.

The model training system 100 trains the student neural network 102 using a teacher neural network 103. The teacher neural network 103 has been trained on a first training image dataset using a conventional machine learning training technique to determine trained values of a plurality of teacher model parameters of the teacher neural network 103. Generally, a neural network receives input and generates an output based on the received input and on values of the parameters of the neural network.

The model training system 100 trains the student neural network 102 on a second training image dataset in order to determine trained values of a plurality of student model parameters of the student neural network 102.

In particular, the model training system 100 processes each training input image 101 of the second training image dataset using the teacher neural network 103 in accordance with the trained values of the plurality of teacher model parameters to generate a plurality of teacher intermediate feature maps (not shown) and a teacher global feature map 105. Specifically, the teacher neural network 103 comprises a plurality of teacher resolution blocks and the plurality of teacher intermediate feature maps are respective outputs of the plurality of teacher resolution blocks. Further, the teacher global feature map 105 is an output in the end of the teacher neural network 103.

Also, the model training system 100 processes the each training input image 101 of the second training image dataset using the student neural network 102 to generate a plurality of student intermediate feature maps (not shown) and a student global feature map 104. Specifically, the student neural network 102 comprises a plurality of student resolution blocks and the plurality of student intermediate feature maps are respective outputs of the plurality of student resolution blocks. Further, the student global feature map 104 is an output in the end of the student neural network 102.

Blocks in the plurality of teacher resolution blocks and the plurality of student resolution blocks may be different in respect of the depth of layers and the feature map sizes thereof.

In order to guide the student neural network 102 to learn meaningful low-level representation (e.g., corner and edge extraction) of the teacher neural network 103 (i.e., block named Feature transfer in FIG. 1), the model training system 100 provides a feature transfer loss that measures a distance between the plurality of teacher intermediate feature maps and the plurality of student intermediate feature maps. In particular, the feature transfer loss is defined in accordance with Equation 1:

$$\mathcal{L}_{FT} = \sum_{i}^{WHC} \begin{cases} 0 & \text{if } r(S_i) \le T_i \le 0 \\ (r(S_i) - T_i)^2 & \text{otherwise} \end{cases} \quad \text{[Equation 1]}$$

Where $\mathcal{L}_{FT}$ is the feature transfer loss; $S_i$ is the student intermediate feature map at each student resolution block of the student neural network 102; $T_i$ is the teacher intermediate feature map at each teacher resolution block of the teacher neural network 103; WHC stands for width, height and channel of the student intermediate feature maps and the teacher intermediate feature maps; r is a convolution layer of the student neural network 102 that transforms $S_i$ to match the size of $T_i$. Depending on the configuration of the student neural network 102 and the teacher neural network 103, the transformation needs to increase or decrease the size of $S_i$ accordingly.

To ensure the student neural network 102 and the teacher neural network 103 are equivalent, the model training system 100 provides a diffeomorphism matching loss that measures a distance between the teacher global feature map 105 and the student global feature map 104. The model training system 100 uses two supporting networks that are a first supporting neural network 106 and a second supporting neural network 107 to generate the diffeomorphism matching loss.

In particular, the diffeomorphism matching loss comprises a commutative loss and an identity loss.

The model training system 100 generates the commutative loss by conducting the following steps:
i) processing the student global feature map 104 using the first supporting neural network 106 to generate a first output data;
ii) determining a first commutative loss term that measures a distance between the first output data and the teacher global feature map 105;
iii) processing the teacher global feature map 105 using the second supporting neural network 107 to generate a second output data;
iv) determining a second commutative loss term that measures a distance between the second output data and the student global feature map 104; and
v) combining the first commutative loss term and the second commutative loss term to generate the commutative loss;

In summary, the commutative loss is generated in accordance with Equation 2:

$$\mathcal{L}_c = \sum_{x \in D} \|HS(x) - T(x)\|_2^2 + \|H^{-1}T(x) - S(x)\|_2^2 \quad \text{[Equation 2]}$$

Where $\mathcal{L}_c$ is the commutative loss; D is the second training image dataset; x is a training input image (i.e., the each training input image 101); T is the teacher neural network 103; T(x) is the teacher global feature map 105; S is the student neural network 102; S(x) is the student global feature map 104; H is the first supporting neural network 106; $H^{-1}$ is the second supporting neural network 107; HS(x) is the first output data; $H^{-1}T(x)$ is the second output data.

The model training system 100 generates the identity loss by conducting the following steps:
i) processing the first output data using the second supporting neural network 107 to generate a third output data;
ii) determining a first identity loss term that measures a distance between the third output data and the student global feature map 104;
iii) processing the second output data using the first supporting neural network 106 to generate a fourth output data;
iv) determining a second identity loss term that measures a distance between the fourth output data and the teacher global feature map 105; and
v) combining the first identity loss term and the second identity loss term to generate the identity loss.

In summary, the identity loss is generated in accordance with Equation 3:

$$\mathcal{L}_{id} = \sum_{x \in D} \|H^{-1}HS(x) - S(x)\|_2^2 + \|HH^{-1}T(x) - T(x)\|_2^2 \quad \text{[Equation 3]}$$

Where $\mathcal{L}_{id}$ is the identity loss; D is the second training image dataset; x is the training input image (i.e., the each training input image 101); T is the teacher neural network 103; T(x) is the teacher global feature map 105; S is the student neural network 102; S(x) is the student global feature map 104; H is the first supporting neural network 106; $H^{-1}$ is the second supporting neural network 107; HS(x) is the first output data; $H^{-1}T(x)$ is the second output data; $H^{-1}HS(x)$ is the third output data; $HH^{-1}T(x)$ is the fourth output data.

The first supporting neural network 106 and the second supporting neural network 107 have the same structure that comprises: an input layer, an output layer and three hidden layers between the input layer and the output layer. The three hidden layers sequentially comprise a fully connected layer, a batch normalization layer, and an ELU (exponential linear unit) layer. The structure of the first supporting neural network 106 and the second supporting neural network 107 has the following characteristics:
i) the size of the fully connected layer of the first supporting neural network 106 is the same with the size of the fully connected layer of the second supporting neural network 107;
ii) the size of the batch normalization layer of the first supporting neural network 106 is the same with the size of the batch normalization layer of the second supporting neural network 107; and
iii) since the size of student global feature map 104 and the size of the teacher global feature map 105 may be different due to the configuration of the student neural network 102 and the teacher neural network 103, the size of the ELU layer of the first supporting neural network 106 may be configured to be different from the size of the ELU layer of the second supporting neural network 107 to respectively match the student global feature map 104 of the student neural network 102 and the teacher global feature map 105 of the teacher neural network 103.

The commutative loss and the identity loss are mean square error (MSE) type as shown in the FIG. 1.

The diffeomorphism matching loss is a combination of the commutative loss and the identity loss according to Equation 4.

$$\mathcal{L}_{DM} = \mathcal{L}_{id} + \mathcal{L}_c \quad \text{[Equation 4]}$$

Where $\mathcal{L}_{DM}$ is the diffeomorphism matching loss.

A final loss used to train the student neural network 102 is a combination of the feature transfer loss and the diffeomorphism matching loss according to Equation 5.

$$\mathcal{L} = \mathcal{L}_{FT} + \lambda \mathcal{L}_{DM} \quad \text{[Equation 5]}$$

Where $\mathcal{L}$ is the final loss; $\lambda$ is the hyper-parameter for the final loss.

The model training system 100 adjusts values of the plurality of student model parameters using the final loss to determine trained values of the plurality of student model parameters e.g., using conventional machine learning training techniques. For example, the model training system 100 can use a gradient descent with backpropagation technique to adjust the values of the plurality of student model parameters. Since the purpose of the invention is to train the student neural network 102 based on the trained teacher neural network 103, the adjusting of the parameters of the teacher neural network would not be applied. In particular, it can be seen from FIG. 1 that slashes on the arrows show no gradient is propagated back to the teacher neural network 103.

According to an embodiment, the first training image dataset is bigger than the second training image dataset. In particular, the teacher neural network 103 has been trained on the first training image dataset which is a billion-size dataset while the student neural network 102 is trained on the second training image which is a million-size dataset.

According to another embodiment, the first training image dataset comprises a set of non-medical images while the second training image dataset comprises a set of medical images. For example, the non-medical images may be natural images; the medical images may be X-ray images.

According to another embodiment, the model training system 100 trains the student neural network 102 on the second training image dataset through unsupervised learning. After training student neural network 102, the model training system 100 fine-tunes the trained values of the plurality of the student model parameters of the student neural network 102 for classification and segmentation tasks.

Figure 2:
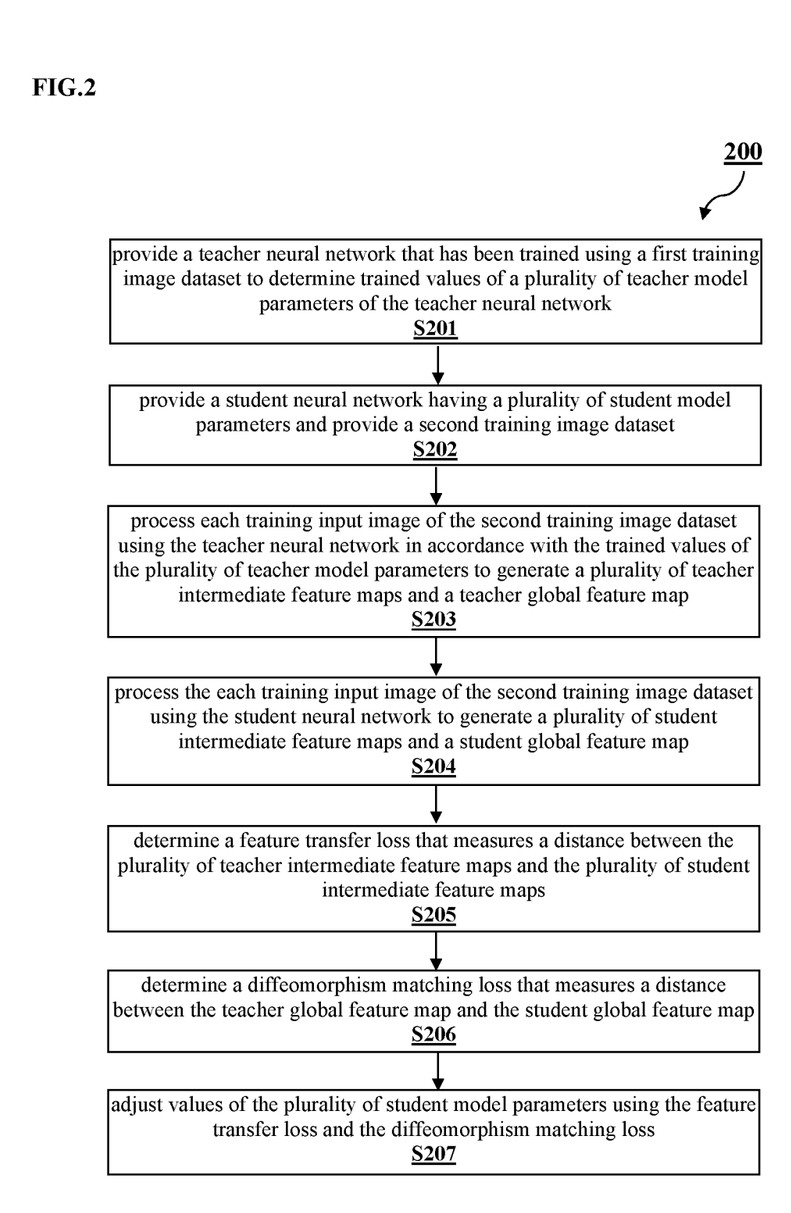
FIG. 2 is a flow diagram of an example process for training a student neural network using a teacher neural network.

FIG. 2 is a flow diagram of an example process 200 for training a student neural network. For convenience, the process 200 will be described as being performed by a system of one or more computers located in one or more locations. For example, a model training system, e.g., the model training system 100 (herein after referred to as "the system") of FIG. 1, appropriately programmed, can perform the process 200.

In step S201, the system provides a teacher neural network, e.g., the teacher neural network 103 of FIG. 1, that has been trained using a first training image dataset to determine trained values of a plurality of teacher model parameters of the teacher neural network.

In step S202, the system provides a student neural network, e.g., the student neural network 102 having a plurality of student model parameters and also provides a second training image dataset to train the student neural network.

In step S203, the system processes each training input image (e.g., the training input image 101 of FIG. 1) of the second training image dataset using the teacher neural network in accordance with the trained values of the plurality of teacher model parameters to generate a plurality of teacher intermediate feature maps and a teacher global feature map (e.g., the teacher global feature map 105 of FIG. 1). In particular, the teacher neural network comprises a plurality of teacher resolution blocks and the plurality of teacher intermediate feature maps are respective outputs of the plurality of teacher resolution blocks, and wherein the teacher global feature map is an output in the end of the teacher neural network.

In step S204, the system processes the each training input image of the second training image dataset using the student neural network to generate a plurality of student intermediate feature maps and a student global feature map (e.g., the student global feature map 104 of FIG. 1). In particular, the student neural network comprises a plurality of student resolution blocks and the plurality of student intermediate feature maps are respective outputs of the plurality of student resolution blocks, and wherein the student global feature map is an output in the end of the student neural network.

In step S205, the system determines a feature transfer loss that measures a distance between the plurality of teacher intermediate feature maps and the plurality of student intermediate feature maps. In particular, the feature transfer loss is defined in accordance with Equation 1 in the description of FIG. 1, so the detailed description thereof is omitted for brevity.

In step S206, the system determines a diffeomorphism matching loss that measures a distance between the teacher global feature map and the student global feature map. In particular, the diffeomorphism matching loss is defined in accordance with Equation 2, Equation 3, and Equation 4 in the description of FIG. 1, so the detailed description thereof is omitted for brevity.

In step S207, the system adjusts values of the plurality of student model parameters using the feature transfer loss and the diffeomorphism matching loss to determine trained values of the plurality of student model parameters.

Experiments

I. Implementation Details

The experiments leverage both public and private chest X-ray datasets (i.e., the second training image dataset) in pretraining. For public datasets, the experiments make use of CheXpert [4], MIMIC-CXR [5], PadChest [6], and ChestX-ray14 [7]. For private dataset, the experiments collected chest X-ray images from local hospitals. The combined dataset contains approximately 1.2M unlabeled radiographs used for self-supervised pretraining. Table 1 shows the detail of these datasets used in pretraining. In Table 1, #Label is the number of labeled radiograph, #Total is the dataset size, and the pretraining (i.e., the model training method and system according to the embodiment of the invention) does not use labels.

TABLE 1

| Dataset | #Label | #Total | Label Usage in Pretraining |
|---|---|---|---|
| CheXpert | 223,648 | 223,648 | No |
| MIMIC-CXR | 257,989 | 257,989 | No |
| PadChest | 154,396 | 154,396 | No |
| ChestX-ray14 | 112,120 | 112,120 | No |
| Private Dataset | 130,030 | 484,235 | No |
| Final Dataset | — | 1,232,388 | No |

After getting the full dataset, the experiments resize all radiographs to have a min size of 320 while keeping the aspect ratio. The images are then normalized to have intensity values in the range [−1,1]. The experiments use random crop to 224×224, horizontal flip, random brightness, translation, rotation (max ±35°), and scale for augmentations. Finally, the experiments add cutout with a maximum of 3 patches of 32×32 pixels.

The experiments use billion-size dataset pretrained model ResNext101-32×48d-WSL [8] for T model (i.e., the teacher neural network) to learn rich pretrained features. The experiments also leverage the RegnetY design in [9] to search for a good S model (i.e., the student neural network) design for chest X-ray tasks. Design spaces of the experiments consist of width multiplier $w_m \in [2, 2.5]$, bottleneck block ratio b∈[0.25, 1], and SE [10] squeeze ratio s∈[1/16, 1/2]. The experiments trained 2K models sampled from all the design spaces on CheXpert dataset and analyze the final result using EDF [9]. The best design space has $w_m$=2.5, b=1, and s=1/16. The final model, called RegChest, has approximately 63M total number of parameters. For Equation 5, the experiments use λ=1 in training pipeline. The experiments follow the same setup as [11] for $\mathcal{L}_{FT}$. The method and system according to the embodiment of the invention is referred to as Diffeomorphism Matching method or DM for brevity.

For optimizer, the experiments use SGD with Nesterov momentum of 0.9. The optimal initial learning rate was found to be 1.5, using the approach in [12]. The experiments adopt the one-cycle learning rate scheduling approach in [12] to train RegChest for 8 epochs. The experiments use the trained S model for fine-tuning downstream tasks. The whole training process was on 4 NVIDIA v100 GPUs with a batch size of 128 (32 each GPU).

II. Fine-Tuning

The experiments compare the pretrained model according to the embodiment of the invention against standard pretrained models on two downstream tasks, classification and segmentation. To reduce the effect of randomness, the experiments trained each model 3 times and took the average and standard deviation performance. For standard pretrained models, the experiments used Densenet121 [13], ResNext101-32×8d [14], RegNetY-16GF [9], Efficientnet-B7 [15], ResNext101-32×8d-WSL [8], and ResNext101-32×16d-WSL [8]. For the classification task, the experiments fine-tuned pretrained models on CheXpert 13 abnormal findings for 8 epochs with the same training pipeline as DM but with an input size of 512×512. The training procedure is kept the same for all the backbones. Due to its massive size, the experiments didn't fine-tune the teacher model ResNext-32×48d-WSL because the experiments can't replicate the training condition of other models on it. Table 2 shows AUC scores of all pretrained models on 500 radiographs in CheXpert test set.

DM based pretrained model RegChest peaks the best natural image pretrained model (Densenet121) on AUC score by 0.4%. However, due to the imbalance between positive and negative instances for each finding, AUC score is not the best performance indicator. The experiments, therefore, measure the F1 score of each model on CheXpert test set. The pretrained model according to the embodiment of the invention surpassed the best natural image pretrained model (ResNext101-32×8d) on 9/13 findings with an average F1 score gain of 4.2% (Table 2). In Table 2, $O(10^{-4})$ stands for value smaller than $5 \times 10^{-4}$ and the best results are in bold.

TABLE 2

| Findings | Densenet121 | Resnext101 32 × 8d | Resnext101 32 × 16d-WSL | Efficientnet B7 | RegnetY 16GF | RegChest DM |
|---|---|---|---|---|---|---|
| AUC | | | | | | |
| Average | 0.898 ± 0.006 | 0.885 ± 0.003 | 0.887 ± 0.004 | 0.875 ± 0.005 | 0.883 ± 0.005 | 0.902 ± 0.005 |
| Enlarged Cardiomediastinum | 0.808 ± 0.006 | 0.793 ± 0.006 | 0.783 ± 0.005 | 0.751 ± 0.011 | 0.700 ± 0.002 | 0.798 ± 0.007 |
| Cardiomegaly | 0.856 ± 0.003 | 0.843 ± 0.003 | 0.838 ± 0.002 | 0.806 ± 0.004 | 0.815 ± 0.006 | 0.856 ± 0.003 |
| Lung Opacity | 0.944 ± 0.004 | 0.943 ± $O(10^{-4})$ | 0.933 ± $O(10^{-4})$ | 0.934 ± $O(10^{-4})$ | 0.937 ± 0.001 | 0.940 ± 0.002 |
| Lung Lesion | 9.961 ± 0.019 | 0.961 ± 0.019 | 0.926 ± 0.003 | 0.926 ± 0.003 | 0.934 ± $O(10^{-4})$ | 0.979 ± 0.002 |
| Edema | 0.896 ± 0.002 | 0.899 ± 0.001 | 0.895 ± 0.005 | 0.900 ± 0.003 | 0.896 ± 0.003 | 0.906 ± $O(10^{-4})$ |
| Consolidation | 0.776 ± 0.009 | 0.761 ± 0.005 | 0.763 ± 0.003 | 0.765 ± 0.007 | 0.778 ± 0.002 | 0.787 ± 0.012 |
| Pneumonia | 0.794 ± 0.009 | 0.805 ± 0.002 | 0.795 ± 0.010 | 0.802 ± 0.004 | 0.827 ± 0.009 | 0.809 ± 0.006 |
| Atelectasis | 0.810 ± 0.008 | 0.811 ± 0.007 | 0.808 ± 0.001 | 0.807 ± 0.006 | 0.804 ± 0.003 | 0.832 ± 0.004 |
| Pneumothorax | 0.992 ± 0.001 | 0.991 ± $O(10^{-4})$ | 0.989 ± 0.001 | 0.989 ± 0.001 | 0.990 ± 0.002 | 0.992 ± $O(10^{-4})$ |
| Pleural Effusion | 0.962 ± 0.001 | 0.966 ± $O(10^{-4})$ | 0.959 ± $O(10^{-4})$ | 0.950 ± 0.001 | 0.958 ± 0.001 | 0.956 ± 0.001 |
| Pleural Other | 0.977 ± 0.007 | 0.965 ± 0.003 | 0.978 ± 0.004 | 0.955 ± 0.007 | 0.951 ± 0.009 | 0.982 ± 0.008 |
| Fracture | 0.925 ± 0.006 | 0.829 ± 0.011 | 0.894 ± 0.017 | 0.864 ± 0.016 | 0.864 ± 0.023 | 0.923 ± 0.015 |
| Support Devices | 0.976 ± 0.001 | 0.972 ± 0.002 | 0.974 ± 0.002 | 0.961 ± 0.001 | 0.971 ± $O(10^{-4})$ | 0.970 ± 0.001 |
| F1 | | | | | | |
| Average | 0.532 ± 0.016 | 0.537 ± 0.008 | 0.523 ± 0.010 | 0.510 ± 0.022 | 0.516 ± 0.015 | 0.579 ± 0.022 |
| Enlarged Cardiomediastinum | 0.599 ± 0.031 | 0.578 ± 0.002 | 0.566 ± 0.012 | 0.571 ± 0.013 | 0.564 ± 0.014 | 0.640 ± 0.009 |
| Cardiomegaly | 0.643 ± 0.019 | 0.612 ± 0.005 | 0.604 ± 0.001 | 0.624 ± 0.012 | 0.602 ± 0.011 | 0.630 ± 0.009 |
| Lung Opacity | 0.878 ± 0.011 | 0.879 ± $O(10^{-4})$ | 0.862 ± 0.007 | 0.867 ± 0.007 | 0.870 ± 0.006 | 0.870 ± 0.011 |
| Lung Lesion | 0.427 ± 0.039 | 0.547 ± 0.035 | 0.483 ± 0.026 | 0.320 ± 0.015 | 0.415 ± 0.042 | 0.545 ± 0.025 |
| Edema | 0.610 ± 0.022 | 0.628 ± 0.002 | 0.614 ± 0.002 | 0.642 ± 0.006 | 0.637 ± 0.014 | 0.638 ± 0.005 |
| Consolidation | 0.320 ± 0.003 | 0.281 ± 0.006 | 0.282 ± 0.005 | 0.297 ± 0.020 | 0.333 ± 0.010 | 0.352 ± 0.035 |
| Pneumonia | 0.219 ± 0.019 | 0.230 ± 0.004 | 0.211 ± 0.009 | 0.188 ± 0.009 | 0.184 ± 0.009 | 0.273 ± 0.018 |
| Atelectasis | 0.587 ± 0.007 | 0.578 ± 0.001 | 0.583 ± 0.002 | 0.598 ± 0.012 | 0.598 ± 0.009 | 0.672 ± 0.015 |
| Pneumothorax | 0.563 ± 0.015 | 0.563 ± 0.025 | 0.546 ± 0.023 | 0.536 ± 0.051 | 0.502 ± 0.044 | 0.596 ± 0.035 |
| Pleural Effusion | 0.790 ± 0.014 | 0.789 ± 0.008 | 0.773 ± 0.010 | 0.767 ± 0.004 | 0.779 ± 0.005 | 0.796 ± 0.005 |
| Pleural Other | 0.218 ± 0.015 | 0.215 ± 0.011 | 0.221 ± 0.030 | 0.162 ± 0.136 | 0.154 ± 0.006 | 0.347 ± 0.105 |
| Fracture | 0.179 ± 0.011 | 0.197 ± 0.005 | 0.161 ± 0.002 | 0.180 ± 0.003 | 0.182 ± 0.018 | 0.276 ± 0.002 |
| Support Devices | 0.885 ± 0.007 | 0.890 ± 0.006 | 0.890 ± 0.008 | 0.874 ± 0.001 | 0.884 ± 0.008 | 0.892 ± 0.005 |

The experiments also investigate whether the pretrained model according to the embodiment of the invention transfers well to other downstream tasks such as segmentation. The experiments use the SIIM Pneumothorax dataset (https://www.kaggle.com/c/siim-acr-pneumothorax-segmentation), which consists of 10,675 radiographs with 8,296 negative and 2,379 positive data points for training and a test set of 1,372 radiographs with 1,082 negatives and 290 positives. For segmentation model, the experiments adopt an Unet like architecture with pretrained models as backbones and an input size of 256×256. The experiments train the models for 70 epochs using Adam optimizer with learning rate drop linearly from $10^{-3}$ to 0. The negatives proportion is gradually increased from 20% to 60% throughout training to address data imbalance. All pretrained backbones use the same training pipeline. As shown in Table 3, pretrained RegChest has a performance gain of 0.7% in Dice score compared with the best natural image pretrained model (Densenet121 and ResNext 32×8d-WSL). The competitive performances on CheXpert and SIIM Pneumothorax dataset show that features pretrained by DM transfer well to downstream tasks.

batch size 128. MoCo training procedure uses the same hardware and data settings as DM.

As shown in Table 5, SDM outperforms MoCo v2 on downstream tasks with 2% gain in AUC score and 4.6% in F1 score on CheXpert, and 0.9% Dice score on SIIM Pneumothorax with only 4.8% of training time. The substantial reduction in training time is due to using a more stable loss function which leads to easier application of more sophisticated learning rate scheduling. The experiments hypothesize the F1 and AUC score performance gain is due to learning richer features from a big model trained on a billion-size dataset.

TABLE 3

| | Densenet121 | Resnext101 32 × 8d | Resnext101 32 × 8d-WSL | Efficientnet B7 | RegnetY 16GF | RegChest DM |
|---|---|---|---|---|---|---|
| Dice Score | 0.808 ± 0.009 | 0.803 ± 0.009 | 0.808 ± 0.011 | 0.805 ± 0.004 | 0.806 ± 0.007 | 0.815 ± 0.002 |

III. Ablation Study

1. Architecture and Loss Components

The experiments study the contribution of each component in Equation 5 as well as training RegChest from scratch. For the contribution of each term, $\mathcal{L}_{D_M}$ outperforms $\mathcal{L}_{FT}$ by 2.2% on F1 score in classification and 0.7% on Dice score in segmentation (Table 4). The performance gains show that $\mathcal{L}_{DM}$ term in Equation 5 contributes more than the $\mathcal{L}_{FT}$ term. The reason is that $\mathcal{L}_{FT}$ only weakly transfers feature maps, as shown in Equation 1, while $\mathcal{L}_{DM}$ directly matches the final feature vector of T (i.e., the teacher neural network) and S (i.e., the student neural network) with each other; hence it has better learning signals. Together, they match local features and global features, leading to the best performance. For network architecture, Table 4 shows that DM pretraining model significantly outperforms its training from scratch counterpart by 4.1% in AUC score and 6.6% in F1 score for classification, and 10.3% increases in Dice score for segmentation. Therefore, the performance gain of DM in Table 2 and Table 3 are from pretraining, not from better neural architecture. All methods in Table 4 use the same RegChest architecture.

TABLE 5

| Pretraining Methods | AUC (CheXpert) | F1 (CheXpert) | Dice (SIIM Pneumothorax) | Training Time (days) |
|---|---|---|---|---|
| MoCo v2 | 0.882 ± 0.004 | 0.533 ± 0.012 | 0.806 ± 0.007 | 28.30 |
| DM | 0.902 ± 0.005 | 0.579 ± 0.022 | 0.815 ± 0.002 | 1.35 |

3. Compare with Distillation Method

Because the method according to the embodiment of the invention can be treated as distillation from a teacher model to a student model, the experiments compare the method according to the embodiment of the invention with distillation methods that can be used for unsupervised pretraining such as Attention Transfer (AT) [16] and Feature Transfer (FT) [11]. For AT and FT, the experiments only use their feature loss for pretraining.

As shown in Table 6, DM pretrained model outperforms AT and FT on both AUC and F1 score on CheXpert with a gain of 1.4% on AUC score and 3.7% on F1 score. AT and FT requires supervisory signal from a teacher model trained on labeled data to achieve a good final performance. Therefore, in the case of lacking such signal, their performances fall short compared to DM.

TABLE 4

| No Pretrain | $\mathcal{L}_{FT}$ | $\mathcal{L}_{DM}$ | AUC (CheXpert) | F1 (CheXpert) | Dice (SIIM Pneumothorax) |
|---|---|---|---|---|---|
| ✓ | — | — | 0.861 ± 0.034 | 0.513 ± 0.065 | 0.712 ± 0.009 |
| — | ✓ | — | 0.886 ± 0.003 | 0.515 ± 0.008 | 0.793 ± 0.004 |
| — | — | ✓ | 0.886 ± 0.004 | 0.537 ± 0.012 | 0.801 ± 0.003 |
| — | ✓ | ✓ | 0.902 ± 0.005 | 0.579 ± 0.022 | 0.815 ± 0.002 |

TABLE 6

| Methods | AUC | F1 |
|---|---|---|
| AT | 0.882 ± 0.006 | 0.542 ± 0.007 |
| FT | 0.886 ± 0.003 | 0.515 ± 0.008 |
| DM | 0.902 ± 0.005 | 0.579 ± 0.022 |

2. Compare with Unsupervised Pretraining

The experiments compare SDM with a standard unsupervised pretraining method MoCo v2 [2]. The experiments use the official implementation of MoCo v2 on RegChest. Due to the increase in memory size, the experiments reduce the queue size from 65K to 32.7K. Because MoCo training is unstable initially, the experiments were not able to apply one-cycle scheduling to it. Therefore, the experiments follow the original setting to train MoCo for 800 epochs with For a system of one or more computers to be configured to perform particular operations or actions means that the system has installed on it software, firmware, hardware, or a combination of them that in operation cause the system to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A model training method comprising:
providing a teacher neural network that has been trained using a first training image dataset to determine trained values of a plurality of teacher model parameters of the teacher neural network;
providing a student neural network having a plurality of student model parameters;
providing a second training image dataset;
processing each training input image of the second training image dataset using the teacher neural network in accordance with the trained values of the plurality of teacher model parameters to generate a plurality of teacher intermediate feature maps and a teacher global feature map, wherein the teacher neural network comprises a plurality of teacher resolution blocks, wherein the plurality of teacher intermediate feature maps are respective outputs of the plurality of teacher resolution blocks, and wherein the teacher global feature map is an output in the end of the teacher neural network;
processing the each training input image of the second training image dataset using the student neural network to generate a plurality of student intermediate feature maps and a student global feature map, wherein the student neural network comprises a plurality of student resolution blocks, wherein the plurality of student intermediate feature maps are respective outputs of the plurality of student resolution blocks, and wherein the student global feature map is an output in the end of the student neural network;
determining a feature transfer loss that measures a distance between the plurality of teacher intermediate feature maps and the plurality of student intermediate feature maps;
determining a diffeomorphism matching loss that measures a distance between the teacher global feature map and the student global feature map; and
adjusting values of the plurality of student model parameters using the feature transfer loss and the diffeomorphism matching loss to determine trained values of the plurality of student model parameters.

2. The method of claim 1, wherein the diffeomorphism matching loss comprises a commutative loss and an identity loss, wherein
the commutative loss is generated by:
processing the student global feature map using a first supporting neural network to generate a first output data;
determining a first commutative loss term that measures a distance between the first output data and the teacher global feature map;
processing the teacher global feature map using a second supporting neural network to generate a second output data;
determining a second commutative loss term that measures a distance between the second output data and the student global feature map; and
combining the first commutative loss term and the second commutative loss term to generate the commutative loss;
and
the identity loss is generated by:
processing the first output data using the second supporting neural network to generate a third output data;
determining a first identity loss term that measures a distance between the third output data and the student global feature map;
processing the second output data using the first supporting neural network to generate a fourth output data;
determining a second identity loss term that measures a distance between the fourth output data and the teacher global feature map; and
combining the first identity loss term and the second identity loss term to generate the identity loss.

3. The method of claim 2, wherein the first supporting neural network and the second supporting neural network comprise the same structure that comprises: an input layer, an output layer and three hidden layers between the input layer and the output layer, wherein the three hidden layers sequentially comprise a fully connected layer, a batch normalization layer, and an ELU (exponential linear unit) layer, and
wherein the size of the fully connected layer of the first supporting neural network is the same with the size of the fully connected layer of the second supporting neural network, and
wherein the size of the batch normalization layer of the first supporting neural network is the same with the size of the batch normalization layer of the second supporting neural network, and
wherein the size of the ELU layer of the first supporting neural network is different from the size of the ELU layer of the second supporting neural network to respectively match the student global feature map of the student neural network and the teacher global feature map of the teacher neural network.

4. The method of claim 3, wherein the first training image dataset is bigger than the second training image dataset.

5. The method of claim 4, wherein the first training image dataset comprises a set of non-medical images, and the second training image dataset comprises a set of medical images.

6. The method of claim 5, wherein the medical images are X-ray images.

7. The method of claim 6, wherein the method further comprises fine tuning the trained values of the plurality of the student model parameters of the student neural network for classification and segmentation tasks.

8. A model training system comprising one or more computers and one or more storage devices storing instructions that when executed by the one or more computers cause the one or more computers to perform operations comprising:

providing a teacher neural network that has been trained using a first training image dataset to determine trained values of a plurality of teacher model parameters of the teacher neural network;

providing a student neural network having a plurality of student model parameters;

providing a second training image dataset;

processing each training input image of the second training image dataset using the teacher neural network in accordance with the trained values of the plurality of teacher model parameters to generate a plurality of teacher intermediate feature maps and a teacher global feature map, wherein the teacher neural network comprises a plurality of teacher resolution blocks, wherein the plurality of teacher intermediate feature maps are respective outputs of the plurality of teacher resolution blocks, and wherein the teacher global feature map is an output in the end of the teacher neural network;

processing the each training input image of the second training image dataset using the student neural network to generate a plurality of student intermediate feature maps and a student global feature map, wherein the student neural network comprises a plurality of student resolution blocks, wherein the plurality of student intermediate feature maps are respective outputs of the plurality of student resolution blocks, and wherein the student global feature map is an output in the end of the student neural network;

determining a feature transfer loss that measures a distance between the plurality of teacher intermediate feature maps and the plurality of student intermediate feature maps;

determining a diffeomorphism matching loss that measures a distance between the teacher global feature map and the student global feature map; and adjusting values of the plurality of student model parameters using the feature transfer loss and the diffeomorphism matching loss to determine trained values of the plurality of student model parameters.

* * * * *